W. B. PRESTON.
Balance Scale.
No. 100,066.
Patented Feb. 22, 1870.
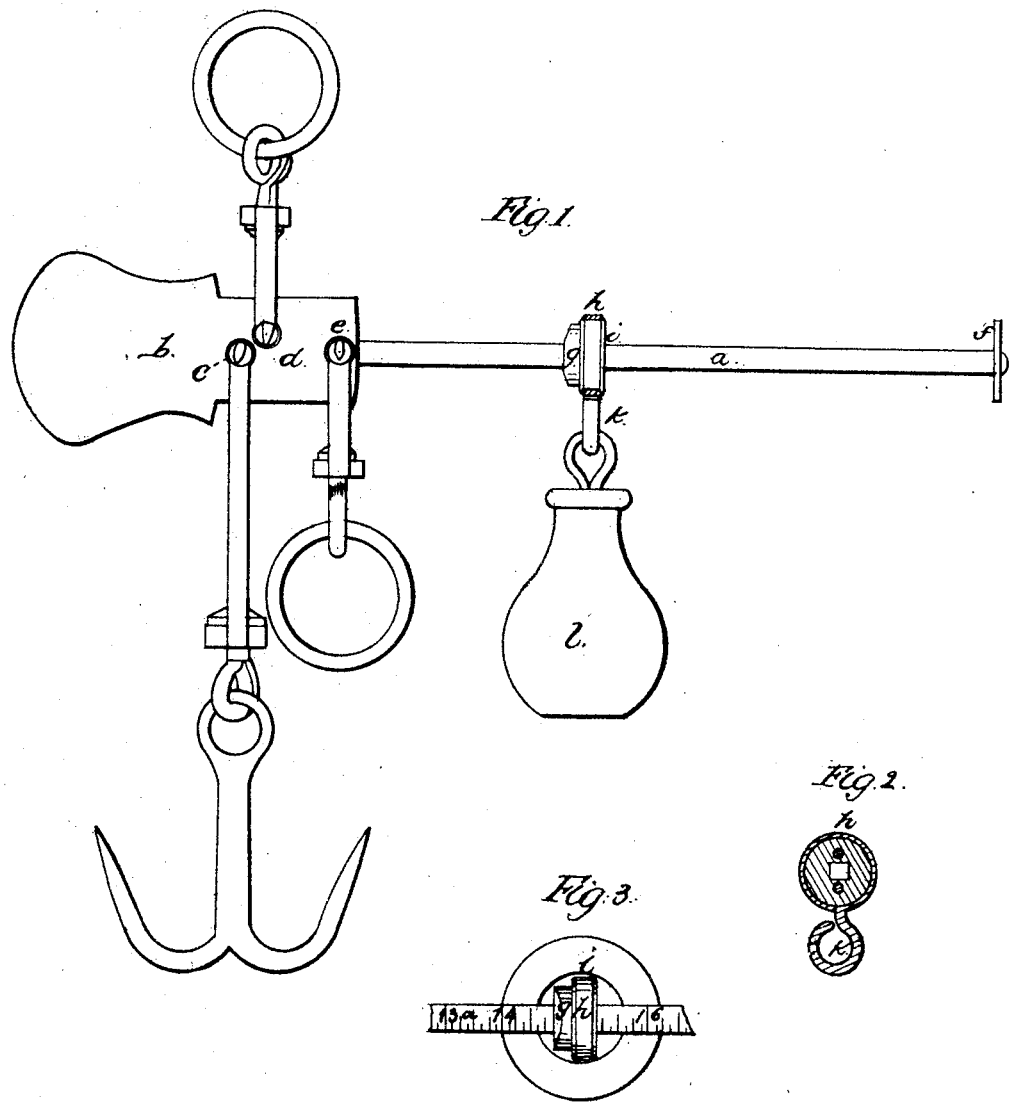
Witnesses.
J. B. Crosby
C. Warren Brown
Inventor.
William B. Preston

United States Patent Office.

WILLIAM B. PRESTON, OF NORTH CHELSEA, MASSACHUSETTS.

Letters Patent No. 100,066, dated February 22, 1870.

IMPROVEMENT IN STEELYARDS.

The Schedule referred to in these Letters Patent and making part of the same.

*To all whom it may concern:*

Be it known that I, WILLIAM B. PRESTON, of North Chelsea, in the county of Suffolk, and State of Massachusetts, have invented an Improvement in Steelyards; and I do hereby declare that the following, taken in connection with the drawings which accompany and form part of this specification, is a description of my invention sufficient to enable those skilled in the art to practice it.

Steelyards are commonly made with two sets of leverages, and two corresponding scales, one for light and one for heavier weighing, the steelyard being turned so as to use one or the other of the leverages, and one or the other of the scales.

Usually the weight is suspended from a ring which surrounds the long arm of the steelyard, which is then arranged with two of its angles in a vertical plane, and the other two in a horizontal plane, the scales being notched on the angles in the vertical plane, and the weight-ring made with a sharp inner boundary fitting in the notches, and sliding over them from end to end of the long arm, with a disagreeable jerking motion, which wears out the notches in time, In a more recent construction this has been improved, by fitting a slide on the long arm or scale-beam, said slide being provided on each side with a trunnion, from which depends the weight hung upon a loop or U-formed piece, which, when brought to the salient end of the long arm, can turn over it in the same manner in which the weighing hook passes over the short arm of the steelyard, in reversing its position.

My invention consists in combining with the long arm or scale-beam of a steelyard a slide, which encompasses the beam, and can be moved over it from end to end of the scales marked thereon, which such slide is encompassed with a ring which can turn freely on the slide, and holds suspended beneath the beam-weight or weighing-poise, so that when the steelyard is turned the ring turns on the slide, keeping the weight always beneath the beam.

In the drawings—

Figure 1 is a side elevation of a steelyard embodying my invention, the ring on the beam slide being shown in section.

Figure 2 is a cross-section of the slide, its encompassing ring, and the eye or loop to which the weighing weight or poise is attached.

Figure 3 is a plan of a portion of the beam, showing one of the scales marked thereon, and the slide and ring from which the weight is suspended.

$a$ is the weighing or scale-beam, or the long arm of the lever.

$b$ is the short arm or counterpoise.

$c$ is the pivot or edge to which the weighing hook is attached.

$d$ is the fulcrum for heavy weighing, and $e$, the fulcrum for light weighing.

$f$ is a stop at the salient end of the weighing beam, to prevent the slide and weight from becoming detached from the steelyard.

Though the scale-beam is shown as arranged with its sides vertical, it may be made with its angles in vertical and horizontal planes.

On the beam $a$, a slide, $g$, is fitted, so as to slide freely over the scales marked thereon, the slide being made with a short flanged cylinder, on which is fitted a ring, $h$, which is kept in place by a washer or head, $i$, secured to the slide. Said ring has an eye or loop, $k$, to which the weighing poise $l$ is attached.

In fig. 1 the steelyard is represented as in position for heavy weighing. If, then, it is reversed for light weighing, the loop to which the hooks are attached swings over the short arm $b$, and the ring $h$ turns on the cylinder formed on the slide $g$, and the weight remains always beneath the scale-beam.

Heretofore, the weighing poise has sometimes been made with a hole through its center, and placed on the scale-beam so as to slide on it and be turned with it, but that is objectionable, because the poise so arranged covers too much of the scale-beam, and makes it unnecessarily long. It also keeps the steelyard from lying flat down upon a bench or other surface, one end being held up by the poise, in which condition the scale-beam is apt to get bent or broken.

I claim a steelyard made with a slide on the scale-beam, when said slide is surrounded by a ring capable of turning thereon, and to which the weighing poise is attached, substantially as and for the purpose described.

WILLIAM B. PRESTON.

Witnesses:
J. B. CROSBY,
C. WARREN BROWN.